United States Patent

Harclerode

[15] 3,635,206

[45] Jan. 18, 1972

[54] ADJUSTABLE MASONRY SAW

[72] Inventor: John R. Harclerode, Prairie Village, Kans.
[73] Assignee: Robert G. Evans Company, Kansas City, Mo.
[22] Filed: Oct. 12, 1970
[21] Appl. No.: 79,869

[52] U.S. Cl. .............................................................. 125/13
[51] Int. Cl. ............................................................ B28d 1/03
[58] Field of Search ............................................. 125/13, 14

[56] References Cited

UNITED STATES PATENTS 1,620,466   3/1927   Jones ........................................ 125/14
2,455,113   11/1948  Coates ..................................... 125/13 SS

*Primary Examiner*—Harold D. Whitehead
*Attorney*—Fishburn, Gold & Litman

[57] ABSTRACT

The reservoir pan incorporates the saw table tracks and is variable in position with respect to the circular saw blade providing adjustability for reducing the necessity of the operator bending over the edge of the pan when a small workpiece is cut.

8 Claims, 3 Drawing Figures

PATENTED JAN 18 1972

3,635,206

INVENTOR.
John R. Harclerode

BY

Fishburn, Gold & Litman
ATTORNEYS

ADJUSTABLE MASONRY SAW

This invention relates to masonry saws and more particularly to the relatively lightweight, circular blade saws commonly used at a construction site for cutting slate, granite, tile, marble and the like.

Such circular masonry saws normally include a reservoir pan located beneath the saw blade for retaining cooling liquids which are continuously pumped therefrom and directed against the rotating blade to provide cooling. Associated with or adjacent to the pan is a workpiece support table movable on tracks or the like upon which a workpiece may be guided into the saw blade by the operator's hands. Heretofore, the reservoir pan was normally either maintained in fixed position on a stand which also supported the saw blade and driving assembly or the assembly stand was received within the pan. In either case, regardless of the size of the workpiece to be cut, the pan extended forwardly of the blade a distance sufficient to underlay the largest workpiece for which the apparatus was designed. When a small workpiece is to be cut, the protruding pan remains in position and forces the operator to bend over the front edge thereof to reach the cutting area. This is inconvenient, uncomfortable and adds to operator fatigue and labor costs in completing the job. Further, it is often difficult to remove the pan for cleaning out the sawdust sludge which tends to build up therein.

In the practice of this invention, the pan is slidably supported for selective horizontal movement parallel to the blade of the circular saw blade, in the manner of a drawer. The pan is, thus, easily adjustable to conveniently locate the saw table in optimum position for the particular size of workpiece to be cut. This is accomplished, in this example, by fixing the saw table tracks within the pan and slidably receiving the pan on a bed portion formed by the rigid frame supporting the saw blade driving assembly. With this arrangement, the most comfortable position for sawing the workpiece at hand may be easily obtained by the operator. Also, the pan is very simply removed completely for cleaning.

It is, therefore, the principal objects of the present invention to provide a masonry saw which includes an arrangement for easily adjusting the position of the reservoir pan and saw table tracks with respect to the saw blade; to provide such apparatus which is more efficient in use and less tiring to the operator; to provide such a device which lends itself to easy portability; and to provide such apparatus which is simple and economical in construction, easily cleaned and maintained, and well adapted for its intended purpose.

Other objects and advantages of this invention will become apparent from the following description taken in connection with the accompanying drawings wherein are set forth by way of illustration and example certain embodiments of this invention.

Figure 1:
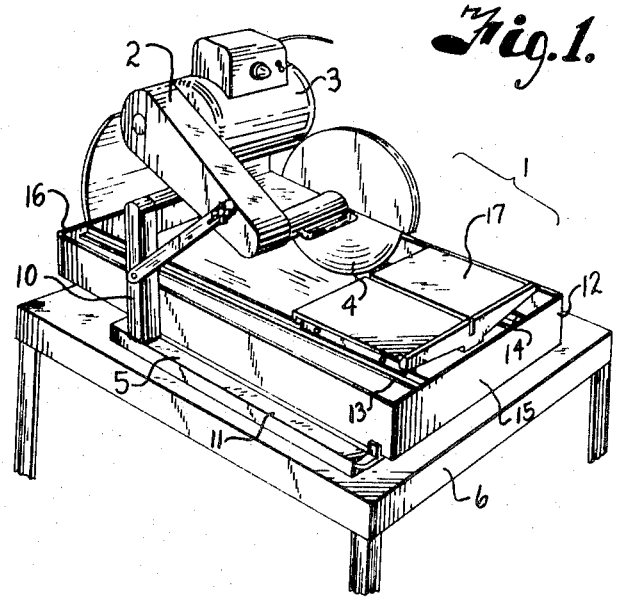
FIG. 1 is a fragmentary perspective view showing masonry saw apparatus embodying this invention with the pan recessed for handling smaller workpieces.
Figure 3:
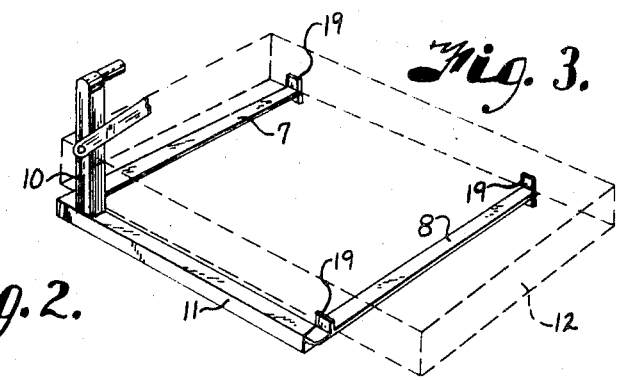
FIG. 3 is a fragmentary perspective view of the saw assembly frame showing details of the pan supporting legs, the pan being indicated by broken lines.

Referring to the drawings in more detail:

The reference numeral 1 generally indicates a masonry saw embodying this invention. The masonry saw 1 includes a saw assembly 2 having a drive motor 3 at one end and an abrasive circular saw blade 4 at the other end. The drive motor 3 is adapted, by known drive means (not shown) for rotating the circular saw blade 4 at a high speed about a horizontal axis.

The masonry saw 1 includes a rigid frame 5 which, in this example, is shown supported on a suitable table 6, however, it is to be understood that the frame 5 may be self-supporting on legs (not shown) designed for the purpose. The frame 5 includes a pair of parallel, spaced-apart, horizontally projecting legs 7 and 8 defining a bed portion 10 elongated in the direction of the plane containing the circular saw blade 4. A standard 10 extends vertically from a side channel 11 forming a connecting structure with the horizontal legs 7 and 8. The saw assembly 2 is pivotally supported on the standard 10 in the known manner and positioned to locate the circular saw blade 4 in a vertical plane generally bisecting the bed portion 10 and elevated thereabove.

An open elongated rectangular reservoir pan 12 is adapted to contain cooling liquid (not shown) which is continuously drawn therefrom and pumped against the saw blade 4 by known devices (not shown) during saw operation. Track-forming members 13 and 14 are formed of suitable structural material and extend longitudinally within the pan in spaced-apart parallel relation. In this example, the track members are welded at opposite ends thereof to the interior surfaces of the pan end walls 15 and 16. A workpiece supporting cart or saw table 17 has suitable track wheels 18 engaging the respective track members 13 and 14 for guided, longitudinal, reciprocal movement horizontally along the pan for directing a workpiece (not shown) against the circular saw blade 4.

The reservoir pan 12 is longitudinally slidably received on and supported by the projecting legs 7 and 8 for selective horizontal movement parallel to the plane of the saw blade 4. Unwanted lateral movement of the pan 12 is prevented by means of upstanding ears 19 formed, where necessary, at ends of the respective horizontal legs 7 and 8.

Figure 2:
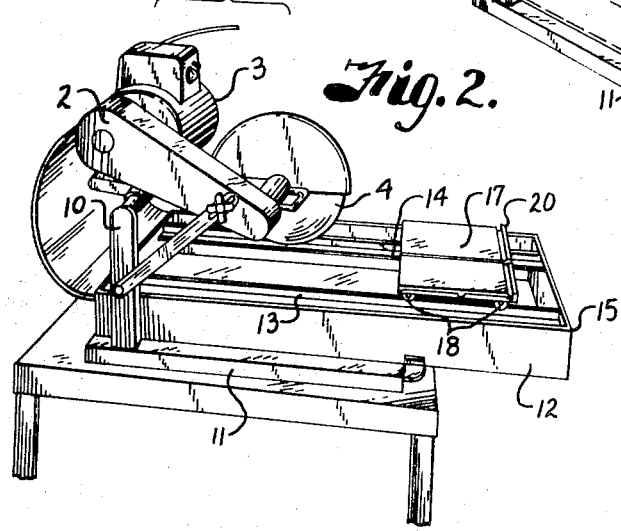
FIG. 2 is a fragmentary perspective view of the apparatus shown in FIG. 1 with the pan extended forwardly for handling larger workpieces.

Thus, the reservoir pan 12 is selectively adjustable in horizontal position beneath the circular saw blade 4 to optimally position the front end wall 15 of the pan for the size workpiece at hand. In operation, if it is desired to cut a larger workpiece (not shown) the pan 12 is withdrawn forwardly to a position, such as shown in FIG. 2, whereby considerable area is available between the fence or backstop 20 of the saw table 17 and the circular saw blade 4. If, however, the operator wishes to cut a smaller workpiece, the pan 12 is merely pushed rearwardly, for example, to the position shown in FIG. 1, whereupon the operator may produce a cut without uncomfortable bending or reaching otherwise required. The pan 12 is easily withdrawn completely from the frame 5 for cleaning.

It is to be understood that while one form of this invention has been illustrated and described, it is not to be limited thereto except insofar as such limitations are included in the following claims.

What I claim and desire to secure by Letters Patent is:

1. A saw comprising:
    a. a saw assembly having a driven circular saw blade adapted for rotation about a horizontal axis,
    b. a frame including a horizontal bed portion and a standard extending upwardly from said bed portion, said saw assembly being supported on said standard and positioned to locate said circular saw blade above said bed portion,
    c. a pan on said bed portion, a workpiece supporting saw table, track means movable with said pan and adapted to provide reciprocal guidance for said saw table above said pan and beneath said saw blade,
    d. said pan being movably received on said bed portion for selective horizontal movement parallel to the plane of said saw blade, whereby said pan is adjustable in position beneath said saw blade to provide convenience in cutting various size workpieces resting on said saw table.
2. The saw as set forth in claim 1 wherein:
    a. said saw assembly has a drive motor at one end thereof and said circular saw blade at the other end thereof, said circular saw blade being adapted for driving rotation by said motor,
    b. said motor being elevated above said pan.
3. The saw as set forth in claim 1 wherein:
    a. said frame is constructed of rigid structural members and said bed portion is defined by a pair of spaced-apart horizontally projecting legs.
4. The saw as set forth in claim 3 wherein:
    a. said bed legs have upstanding ears for laterally retaining said pan thereon.
5. The saw as set forth in claim 1 wherein:

a. said saw blade is positioned in a vertical plane generally bisecting said bed portion.

6. The saw as set forth in claim 1 wherein:

a. said pan is elongated and rectangular in shape and extends longitudinally of the plane containing said saw blade.

7. The saw as set forth in claim 1 wherein:

a. said track means comprises a pair of parallel, spaced-apart track members secured to said pan.

8. The saw as set forth in claim 7 wherein:

a. said pan has opposed upstanding end walls, and
b. said track members have opposite ends thereof welded to said end walls.

* * * * *